Feb. 5, 1935.  H. ALBERTZ  1,990,158

ROUTING MACHINE

Filed Oct. 4, 1933

INVENTOR:
HANS ALBERTZ
By Francis E. Boyce
ATTORNEY

Patented Feb. 5, 1935

1,990,158

UNITED STATES PATENT OFFICE 1,990,158

ROUTING MACHINE

Hans Albertz, Bad-Godesberg, Germany

Application October 4, 1933, Serial No. 692,072
In Germany October 6, 1932

7 Claims. (Cl. 144—87)

My invention relates to routing or cutting machines and, more particularly, to the type provided with a plurality of cutters mounted on parallel shafts so as to cut a plurality of grooves or the like simultaneously.

It is an object of my invention to provide a machine of the type mentioned, which is capable of cutting a great variety of grooves, mortices, tenons or the like, either dove-tailed or plain.

Another object of my invention is to facilitate the adjustment of the machine for the cutting of a plurality of grooves of any desired distance from each other.

Still other objects of my invention will appear in the following description:—

In the accompanying drawing:—

Figure 3:
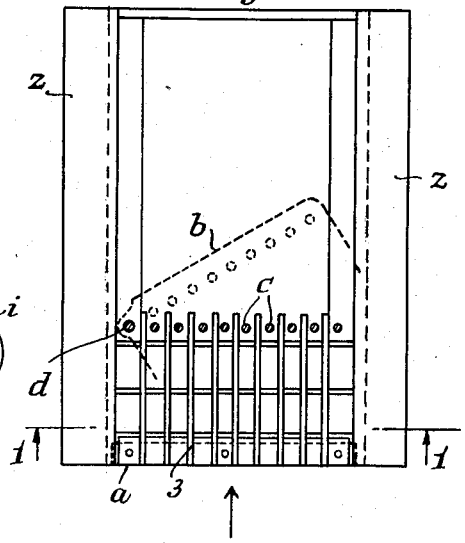
Fig. 3 is a plan view of the machine, the carriage holding the work having been removed.

The machine comprises a main or machine frame $a$ with lateral flanges $z$ serving as sliding tracks or guides for the carriage or work holder $r$, slidably mounted thereon. Below this work holder $r$ there is secured to the front-wall of the machine frame $a$ a horizontal grate 3 as shown in Fig. 3 of the drawing covering a portion of the space existing between the two flanges $z$. As shown in Fig. 3, the grate comprises a plurality of spaced horizontal bars extending transversely and longitudinally of the frame, the longitudinal bars extending at their inner ends beyond the last transverse bar thereby providing unobstructed spaces between the longitudinal bars. At some distance below the grate 3, a vertical shaft $d$ is journalled in bearings attached to the machine frame $a$ and is capable of being adjusted in the direction of its axis by means of a foot-step bearing 6 which may be raised or lowered by operating a handle.

The shaft $d$ carries a frame which I term "tool frame" and which is rotatable about the axis of the shaft $d$ to a certain extent. In the two horizontal cross bars of this tool frame a plurality of tool shafts $c$ are journalled with their axes in parallel to each other as well as to the shaft $d$, and with equal and invariable distances between them. For reasons which will be explained further below, I find it advisable to provide the same distance also between the shaft $d$ and the next following shaft $c$.

Each shaft $c$ bears, on an extension reaching beyond the upper cross bar, a cutter or routing tool $c^1$, all these cutters forming a single row. Further, each shaft $c$ is provided with a pulley $p$, but alternate pulleys are mounted at a higher and at a lower level respectively, so that the pulleys $p_1$, $p_3$, $p_5$, $p_7$, $p_9$ of the first, third, fifth, seventh and ninth shafts form one row, while the pulleys $p_2$, $p_4$, $p_6$, $p_8$ of the second, fourth, sixth and eighth shafts form another row. The axes of all the shafts $c$ and, preferably, also the axis of the shaft $d$ are disposed within the same plane.

In addition thereto there are rotatably mounted in the tool frame $b$ a plurality of idlers $o$, and an extension of the lower cross bar of the tool frame $b$ carries an electric motor $i$ provided with a driving pulley $k$. As will be noted from Figures 1 and 2, the extension of the lower cross bar reaches through an opening $g$ provided in the machine frame $a$, so that the motor $i$ and the pulley $k$ are located outside the machine frame $a$ and, consequently, are readily accessible. Furthermore, the lower rim of the opening $g$ forms a sort of flange provided with a series of pairs of holes $h$, in which bolts may be inserted for securing the tool frame $b$ at varying angles with respect to the machine frame $a$.

Figure 2:
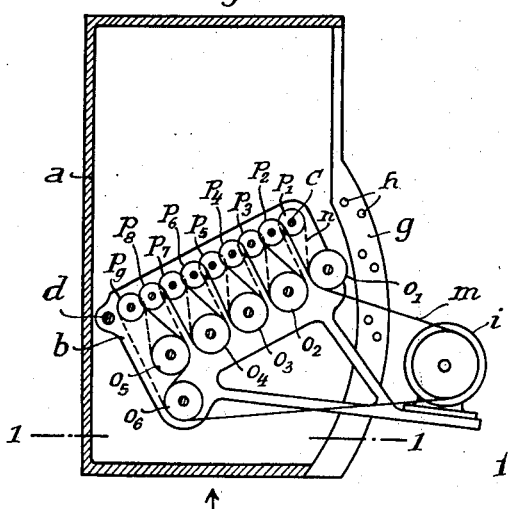
Fig. 2 is a horizontal section on line 2—2, Fig. 1.

The pulley $k$ drives two superimposed belts $n$ and $m$. The belt $m$, which is shown in Fig. 2 in full lines, passes first over the idler $o_1$, then over the pulley $p_2$ which is the first of the series at the higher level, then over a second idler $o_2$ and so on alternately over all the pulleys $p_4$, $p_6$, $p_8$ at the higher level and the idlers $o_2$, $o_3$, $o_4$, $o_5$, arranged beside them. Ultimately the belt is deflected by the idler $o_6$ and passes back to the pulley $k$. By this arrangement of driven pulleys alternating with idlers having materially larger diameters I obtain an angle of contact between the belt and each pulley which, as it exceeds 180°, efficiently prevents any sliding of the belt.

The lower belt $n$, which is shown in Fig. 2 in dotted lines, passes in an analogous manner over the first idler $o_1$, then over the first pulley $p_1$ appertaining to the lower row, and then alternately over the idlers $o_2$, $o_3$, $o_4$, $o_5$, and the pulleys $p_3$, $p_5$, $p_7$, $p_9$, and is ultimately deflected by the idler $o_6$ and passes back to the driving pulley $k$.

Figure 1:
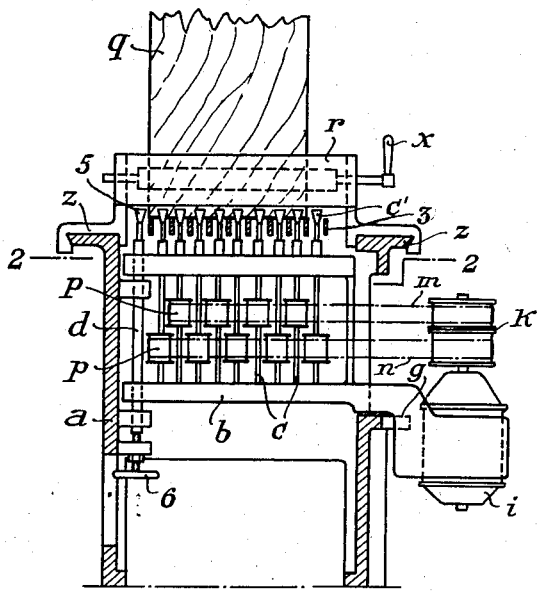
Fig. 1 is a sectional elevation on line 1—1, Fig. 2, of a machine according to my invention.

All the idlers, which have been omitted in Figure 1 for reasons of clearness of that drawing but are distinctly shown in Fig. 2, are designed to guide both of the superimposed belts $n$ and $m$.

The last idler $o_6$ may be journalled either resiliently or adjustably so that it functions as a belt tightener, and in such a case I may construct this idler of two independently resilient or adjustable parts in order to make the tightening of one belt independent of that of the other belt.

It will be noted, that the arrangement of the pulleys $p$ in two rows at different levels enables me to design them with considerably larger diameters than would be possible with all the pulleys arranged in a single row. In view of these increased diameters I obtain a far better efficiency and safety against sliding even at very heavy loads.

The work holder $r$ consists of a base having two longitudinal side flanges in sliding engagement with the flanges $z$ of the machine frame $a$. A plurality of vertical walls are mounted on this base, comprising the wall $s$ arranged at right angles with the direction of movement, the wall 7 slightly inclined towards one of the sides of the base, the wall 8 inclined at the same angle of inclination towards the other side of the base, and two longitudinal walls each of which is made up of three sections spaced apart as indicated at 4 in Fig. 4. The walls 7 and 8 and the middle sections of the longitudinal walls are secured not to the base proper, but to a separate base 9, secured to the main base and laterally adjustable with respect to the latter.

Figure 5:
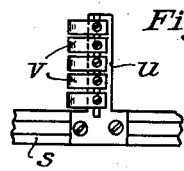
Fig. 5 shows a detail of the carriage on a larger scale.

Each of the walls $s$, 7 and 8 is provided with a detachable angle-iron stop $t$ and with a horizontal groove, in which a clamping finger $u$ is slidably mounted. This finger, which is more distinctly shown in Fig. 5, is provided with a plurality of detachable, suitably curved plate springs $v$.

Journalled in the longitudinal side walls and adjustable both in axial and circumferential direction by means of handles and suitable locking devices (not shown) are three shafts $w$ carrying eccentrically arranged rollers $y$ serving as clamping means.

In order to cut in a board, or in a pile of superimposed boards, a plurality of straight mortices of any desired length, width and distance from each other I first fix on the shafts $c$ a set of cylindrical cutters $c_1$ with diameters corresponding to the desired width of the mortices. Then I clamp the board, or the pile of boards, to the wall $s$ of the work holder $r$. The horizontal grate 3 serving as bottom stop and the angle iron $t$ serving as side stops for the work are used as stops for two adjoining edges of the board, the clamping finger $u$ is moved laterally until the springs $v$ firmly press against the third edge, and, ultimately, the eccentric roller $y$ is first moved axially and then turned by means of the handle until it also firmly presses against one side of the board. The roller $y$ is then locked, and the board $g$ is now clamped in the position shown in Fig. 1.

In order to obtain the desired depth of the mortices, I raise or lower the tool frame $b$ by means of the handle 6, and by turning the tool frame about the shaft $d$ and by securing it at a suitable angle with the direction of movement of the work I may also obtain any desired distance between two adjacent mortices. This distance, it will be noted, is not equal to the actual and, as a fact invariable distance of the cutters $c_1$ from each other, but is smaller in proportion to the sine of the angle of inclination between the tool frame $b$ and the direction of the work.

Figure 4:
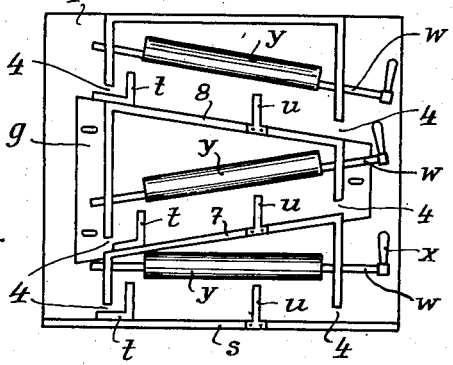
Fig. 4 is a plan view of the carriage or work holder.

After these preparatory adjustments are completed, I start the motor $i$ and by pushing the work holder $r$ towards the cutters $c_1$ in the direction indicated by arrows in Figs. 3 and 4, I simultaneously obtain nine mortices of the desired dimensions and at the desired distances from each other.

In order to produce mortices dove-tailed in the lengthwise direction of the board, I proceed in the same way, but I use conical cutters instead of the cylindrical ones.

In order to produce mortices dove-tailed in the direction of the thickness of the board, I first clamp the latter to the vertical wall 7 of the work holder $r$, and leading the work holder over cylindrical cutters $c_1$, I produce a set of mortices with parallel walls being at a certain acute angle with the direction of the thickness of the board. In the second step, I clamp the board in a similar manner to the wall 8 of the work holder, and, leading the latter again over the cutters $c_1$, I produce another set of mortices partly coincident with those produced in the first step, but inclined in the opposite direction. The total effect is a set of mortices dove-tailed in the direction of the thickness of the board, as desired. The angle between the walls of these mortices is the same as that between the walls 7 and 8 of the work holder $r$.

If I want to produce in the edge of a large board a number of mortices more than the number of the cutters $c_1$, i. e. more than nine mortices when using the machine specifically illustrated in the drawing, I remove the clamping fingers $u$ and the angle irons $t$, the latter being temporarily replaced by bolts inserted in suitable holes provided in the walls $s$, 7 or 8, as the case may be. Apart from this, the clamping of the board, and the cutting of the first set of mortices do not differ from the procedure described above.

Before cutting the next set of mortices I attach to the upper end of the shaft $d$ a cap 5 having exactly the same dimensions as the cutters $c_1$. Inserting this cap in the last of the mortices produced in the first cutting step, I use it as a stop to obtain between the last mortice of the first series and the first one of the second series exactly the same distance as between two adjacent mortices of the same series.

In a similar manner, I may cut in the same edge of a long board any desired number of mortices, all exactly of the same dimensions and with exactly equal distances between them. With the angle-irons $t$ and the clamping fingers $u$ removed, boards of any length may readily be inserted in the spaces provided by the slots 4 and clamped to any of the walls $s$, 7 or 8 in any required position.

From Fig. 3 it will be noted that the bars of the grate 3 do not reach materially beyond the row of the cutters $c$ if this row stands at right angles with the sliding tracks $z$, and the less so if the tool frame $b$ bearing these cutters is in the more or less inclined working position indicated in dotted lines. In view thereof, the grate 3, which serves in the clamping procedure as a stop for the lower edge of the board, does not interfere with the withdrawing of the cutting dust.

In the above description I have explained my invention with a close reference to the specific example illustrated in the drawing, but I wish it to be understood that my invention is not limited thereto, but also comprises various modifications and improvements thereof, as will be obvious to those skilled in the art.

The feature which I consider as most important is the provision of a tool frame provided with a plurality of cutters arranged to produce a corresponding number of separate grooves, mortices or the like, and cooperating with a reciprocating work holder, the angle between the plane of said tool frame and the direction of movement of the work holder being adjustable so as to influence the distance between two adjacent mortices produced. In this connection it will be understood, that I may fulfill this purpose, though less conveniently, even with a tool frame rigidly secured to a machine frame, but cooperating with a work holder which, apart from its reciprocating movement, also allows for the required adjustment of the angle between the direction of this movement and the plane of the tool frame.

Instead of making the tool frame adjustable in a vertical direction so as to influence the depth of the mortices produced, I may also resort to a grate 3 adjustable in that direction.

I claim:

1. In a routing machine, a machine frame, a work holder slidably mounted on said machine frame, a tool frame carried by said machine frame, a plurality of cutters rotatably mounted in said tool frame in parallel relation to each other and at fixed distances apart, the cutters being arranged to simultaneously cut a plurality of separate grooves in a piece of work, means for driving said cutters, and means for adjusting the angle between the plane of said tool frame and the direction of movement of the work holder thereby to vary the distance between the grooves.

2. In a routing machine, a machine frame, a work holder slidably mounted on said machine frame, a tool frame pivotally and adjustably connected with said machine frame, a plurality of cutters rotatably mounted in said tool frame in parallel to each other and at fixed distances apart, the cutters being arranged to cut a plurality of separate grooves in a piece of work, and means for driving said cutters, said driving means being also mounted on said tool frame.

3. In a routing machine, a machine frame, a work holder slidably mounted on said machine frame, a tool frame pivotally and adjustably connected with said machine frame, a plurality of shafts rotatably mounted in said tool frame in parallel to each other and at fixed distances apart, pulleys secured to said shafts, cutters attached to said shafts, said cutters being arranged to cut a plurality of separate grooves in a piece of work, a driving motor mounted on said tool frame, two belts adapted to be driven by said motor and adapted to drive one of two groups of said pulleys, respectively, the pulleys of the one group alternating with those of the other group, and a set of idlers rotatably mounted in said tool frame, the idlers being designed and arranged to deflect and guide each of said belts so that the angle of contact between each of the pulleys and the belts exceeds 180°.

4. In a routing machine, a machine frame, a work holder slidably mounted on said machine frame, a tool frame pivotally connected with said machine frame and adjustable both axially and angularly, a plurality of cutters rotatably mounted in said tool frame in parallel to each other and at fixed distances apart, the cutters being arranged to cut a plurality of separate grooves in a piece of work, and means for driving said cutters, said driving means being also mounted on said tool frame.

5. In a routing machine, a machine frame, a work holder slidably mounted on said machine frame, a horizontal grate arranged below said work holder and serving as a stop for the lower edge of the piece of work to be secured to said work holder, a tool frame, a shaft rotatably and adjustably connected with said machine frame and carrying said tool frame, a plurality of cutters rotatably mounted in said tool frame in parallel to each other and at fixed distances apart, the cutters being arranged to cut a plurality of separate grooves in a piece of work, means for driving said cutters, said driving means being also mounted on said tool frame and said grate reaching not materially beyond the axis of said shaft carrying said tool frame.

6. In a routing machine, a machine frame, a work holder slidably mounted on said machine frame, vertical walls on said work holder partly arranged to serve as stops for the pieces of work and partly arranged to serve as supports for clamping means for the pieces of work, slots in part of said walls so as to allow for the clamping of pieces of work materially wider than the width of the work holder, a tool frame pivotally and adjustably connected with said machine frame, a plurality of cutters rotatably mounted in said tool frame in parallel to each other, the cutters being arranged to cut a plurality of separate grooves in a piece of work, and means for driving said cutters, said driving means being also mounted on said tool frame.

7. In a routing machine, a machine frame, a work holder slidably mounted on the said machine frame, a tool frame connected with the said machine frame by a shaft, a plurality of rotatable, parallel cutters carried by said tool frame, the cutters being arranged to simultaneously cut a plurality of separate grooves in a work-piece, means for driving the said cutters, and means for adjusting the angle between the plane of the said tool frame and the direction of movement of the work holder, a cap attached to the top of the shaft bearing the tool frame, the said cap having the exact dimensions of the cutters, and all the cutters as well as the said cap being arranged in one single line with equal distances to each other.

HANS ALBERTZ.